United States Patent
Knott et al.

(10) Patent No.: US 6,312,224 B1
(45) Date of Patent: Nov. 6, 2001

(54) RELATING TO BLADED STRUCTURES FOR FLUID FLOW PROPULSION ENGINES

(75) Inventors: David S Knott, Loughborough; Kevin A White, Derby, both of (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/459,866

(22) Filed: Dec. 14, 1999

(30) Foreign Application Priority Data

Dec. 24, 1998 (GB) .................................... 9828484

(51) Int. Cl.⁷ ...................................... F01D 5/14
(52) U.S. Cl. ................ 416/230; 416/229 A; 416/248
(58) Field of Search ......................... 416/229 R, 230, 416/229 A, 223 A, 248

(56) References Cited

U.S. PATENT DOCUMENTS

| | | | |
|---|---|---|---|
| 3,756,745 | * 9/1973 | Alver et al. | 416/230 |
| 4,045,149 | 8/1977 | Ravenhall . | |
| 4,343,593 | * 8/1982 | Harris | 416/193 A |
| 5,403,153 | * 4/1995 | Goetze | 416/229 A |
| 5,573,377 | * 11/1996 | Bond et al. | 416/229 A |

FOREIGN PATENT DOCUMENTS

| | | |
|---|---|---|
| 1408491 SP | 10/1975 | (GB) . |
| 1408492 SP | 10/1975 | (GB) . |
| 2171151 A | 8/1986 | (GB) . |
| 2262966 A | 7/1993 | (GB) . |

* cited by examiner

*Primary Examiner*—Edward K. Look
*Assistant Examiner*—Ninh Nguyen
(74) *Attorney, Agent, or Firm*—W. Warren Taltavull; Manelli Denison & Selter PLLC

(57) ABSTRACT

A component (24) for a gas turbine engine rotor assembly comprises a wall member (26) for at least partially bridging a space between adjacent rotor blades (18) and a root member (42) for insertion into a groove in the rotor disc (18) of the rotor assembly. The root member (42) includes bearing surfaces (46) for bearing against complementary surfaces (48) in the groove on rotation of the disc. The annulus filler (26) comprises a plurality of layers of carbon fiber reinforced plastics material, the layers being oriented substantially perpendicular to the bearing surfaces (46).

17 Claims, 4 Drawing Sheets

RELATING TO BLADED STRUCTURES FOR FLUID FLOW PROPULSION ENGINES

The invention relates to bladed structures for fluid flow propulsion engines, and particularly to compressor rotors for gas turbine engines. More specifically, the invention relates to an improved annulus filler, particularly for the low pressure compressor or fan stage of a gas turbine engine.

BACKGROUND OF THE INVENTION

A compressor for a gas turbine engine includes at least one rotor disc having an array of rotor blades mounted thereon. Until relatively recently, it was common practice to produce rotor blades with integral platforms, the platforms forming the inner wall of the rotor annulus in use. The blade and platform were manufactured as a single unit from a common material. This had the disadvantage that the platforms were formed from a relatively heavy material. Further, any damage to the platform often necessitated the replacement of the entire blade.

Recent developments have led to the use of separate annulus fillers, as an alternative to blade platforms. The annulus fillers are located between adjacent rotor blades and generally have their own features for removably locating them on the rotor disc rim. Such fillers may be manufactured from relatively lightweight materials and, in the event of damage, may be replaced independently of the rotor blades.

SUMMARY OF THE INVENTION

According to the invention there is provided a component for a gas turbine engine rotor assembly including a rotor disc, the component including a root member for engagement with the rotor disc to locate the component thereon and the root member including bearing surfaces for bearing against complementary surfaces on the disc on rotation of the disc, wherein the component includes a plurality of layers of fibre reinforced material, the layers being orientated substantially perpendicular to said bearing surfaces.

Preferably the component includes layers of a first fibre reinforced material having fibres orientated in each of two mutually perpendicular directions and the fibres in the layers of first fibre reinforced material being arranged substantially perpendicular to said bearing surfaces.

The component may include layers of a first fibre reinforced material having fibres orientated in each of two substantially mutually perpendicular directions, and layers of a second fibre reinforced material having fibres orientated substantially in a single direction.

Preferably the fibre reinforced material includes carbon fibre reinforced plastics material.

The root member may be substantially dovetail shaped in cross section, for engaging a dovetail groove in the rotor disc. Alternatively, the root member may include a fir tree root portion, for engaging a complementary groove in the rotor disc.

The root member may be adapted to engage a groove extending in the circumferential direction of the rotor disc. Alternatively, the root member may be adapted to engage a groove extending in the axial direction of the rotor disc.

The component may be an annulus filler for a gas turbine engine rotor assembly including a rotor disc mounting a plurality of radially extending rotor blades and the component may include a wall member for at least partially bridging a space between adjacent rotor blades. The wall member and root member are preferably formed as a single integral moulding. Preferably, at least one layer of fibre reinforced material extends from the wall member into the root member.

The wall member may include a substantially smooth outer surface and an inner surface from which the root member projects.

The component may further include an elongate stiffening web extending along the wall member on said inner surface thereof, substantially in the axial direction of the rotor assembly when fitted thereto. Preferably, at least one layer of fibre reinforced material extends from the wall member into the stiffening web. At least one layer of fibre reinforced material may extend from the wall member into the stiffening web and further into the root member.

According to the invention there is also provided a rotor assembly for a gas turbine engine, the rotor assembly incorporating at least one component according to any of the preceding definitions.

According to the invention there is further provided a gas turbine engine including a rotor assembly according to the preceding paragraph.

BRIEF DESCRIPTION OF THE DRAWINGS

An embodiment of the invention will now be described for the purpose of illustration only with reference to the accompanying drawings, in which.

DETAILED DESCRIPTION OF THE INVENTION

Figure 1:
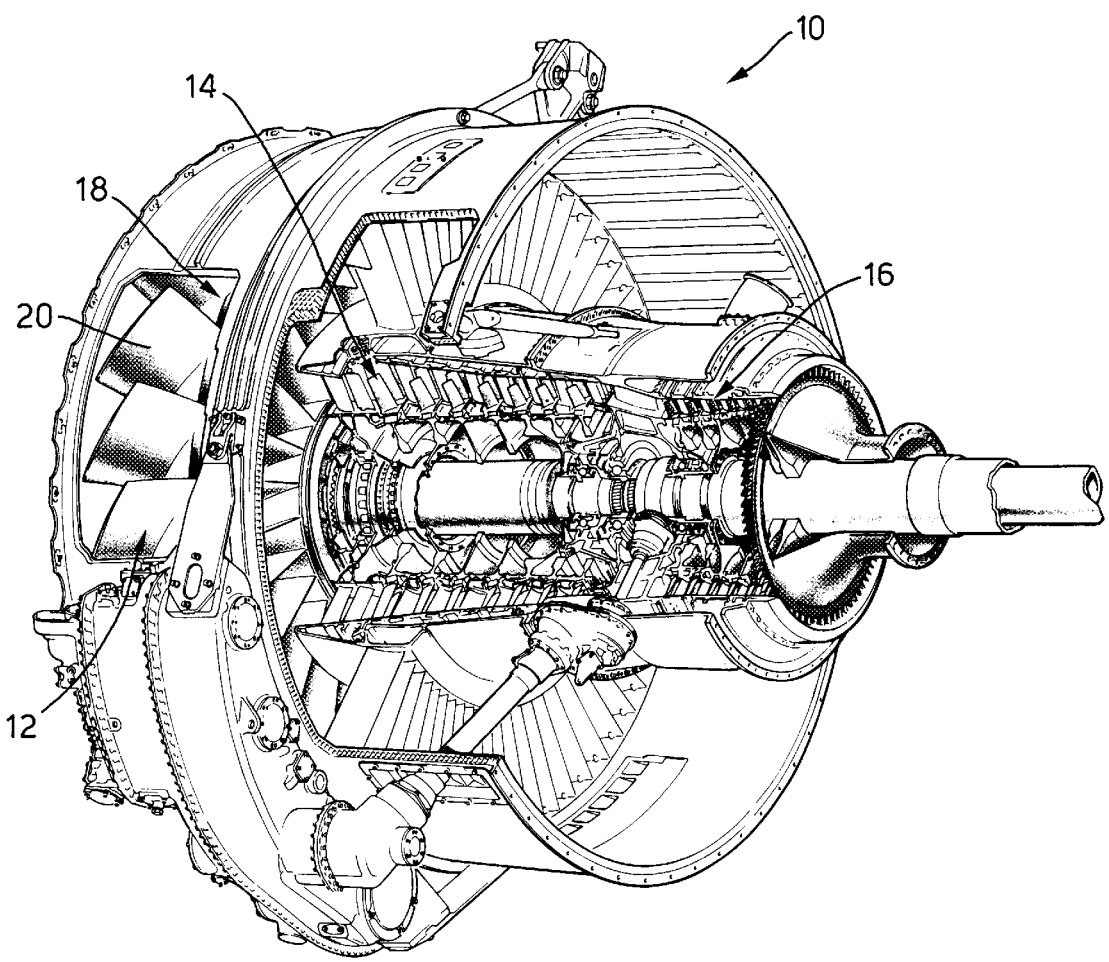
FIG. 1 is a diagrammatic perspective part cut-away illustration of an axial flow compressor for a gas turbine engine.

Referring to FIG. 1, there is shown an axial flow compressor 10 of a gas turbine engine including low pressure, intermediate pressure and high pressure compressors 12, 14 and 16 respectively. Each compressor includes at least one rotor assembly comprising a rotor disc 18 on which are mounted a plurality of rotor blades 20.

Figure 2:
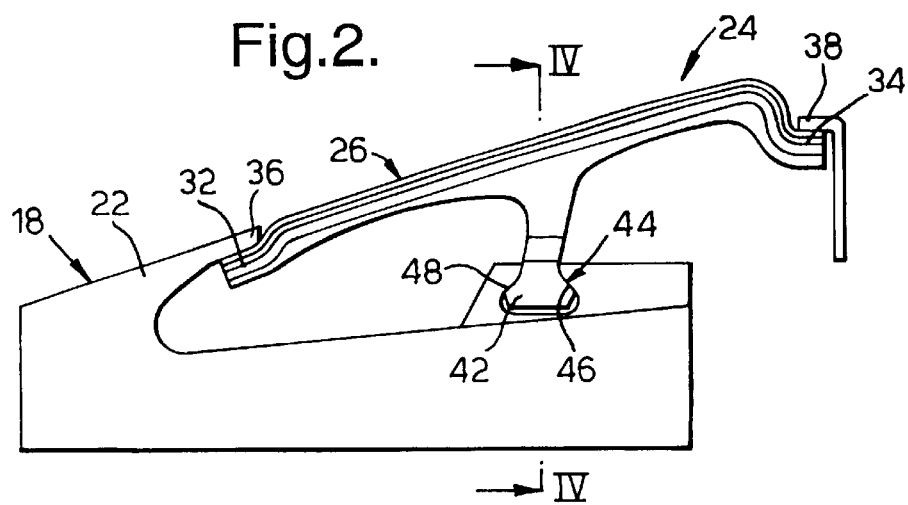
FIG. 2 is a diagrammatic cross section of an annulus filler according to the invention, in place on a rotor disc.

Referring to FIG. 2, a rotor assembly for the low pressure compressor 12 comprises a rotor disc 18 on which the rotor blades are mounted in known fashion. The blades are spaced apart, and a leading part of the space between each two adjacent blades is bridged by a portion 22 of the rotor disc 13. By "leading" is meant the part of the rotor assembly through which air passes first. A rear part of the space between each two adjacent blades is bridged by an annulus filler 24. The filler 24 thus occupies only part of the space between the blades but in some cases could also occupy the forward region 22. The term "annulus filler" as used herein is intended to cover both complete and partial or "mini" fillers.

Figure 3:
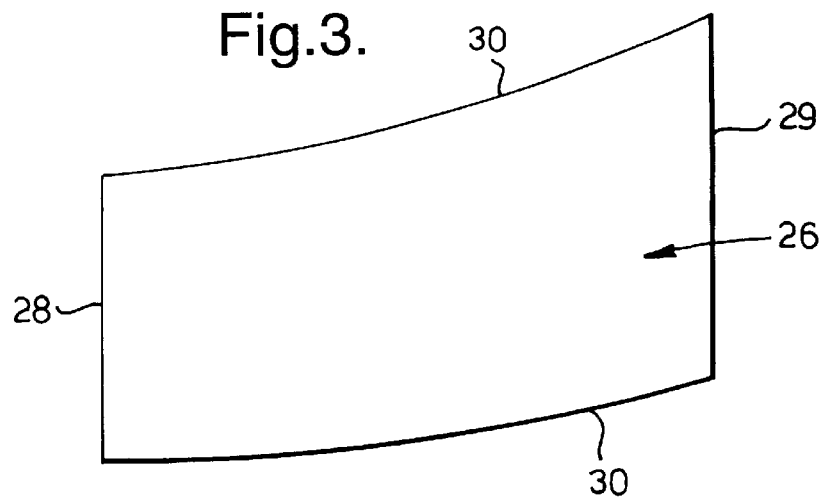
FIG. 3 is a diagrammatic top view of the annulus filler of FIG. 2.

Referring to FIGS. 2 to 7, the annulus filler 24 includes an outer surface or deck portion 26, which provides an airwash surface between the rotor blades 20. FIG. 3 illustrates the deck portion 26 in plan view. The deck portion 26 has substantially straight leading and trailing edges 28 and 29 respectively, extending generally circumferentially of the compressor rotor 18, and curved side edges 30 extending generally axially of the compressor rotor 18. The curvature of the side edges accommodates the curvature of the rotor blades between which the annulus fillers fit.

The deck portion 26 of the annulus filler 24 has a generally smooth upper surface which has a slight circumferential curvature (shown in FIGS. 4 and 7) to enable it to form, with the other fillers between successive rotor blades, a part of an annulus surface which is co-axial with the rotor disc. A leading edge portion of the deck portion is bent to form a flange 32 (see FIG. 2). A similar flange 34 is formed at a trailing edge portion of the deck portion 26. The flange 32 co-operates with an inturned lip 36 on the bridge portion 22 of the rotor disc 18 and the flange 34 co-operates with a hook support 38 from a low pressure compressor booster drive arm (not shown). Seals (not illustrated) seal the deck portion 26 against the low pressure compressor fan blades 20. The seals may be rubber or carbon fibre or other seals either attached by an adhesive or formed integrally with the annulus filler.

Figure 4:
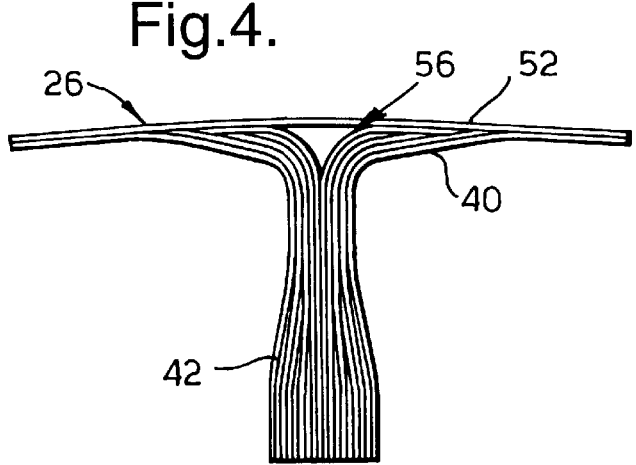
FIG. 4 is a diagrammatic cross section on line IV—IV of FIG. 2.
Figure 5:
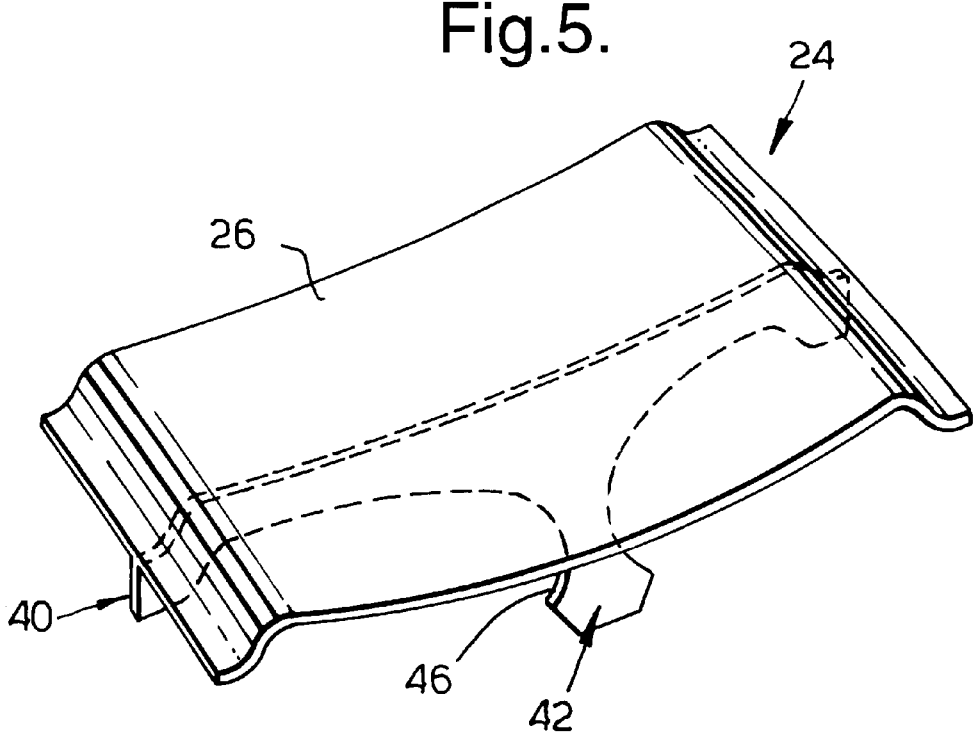
FIG. 5 is a diagrammatic perspective view of the annulus filler of FIG. 2 from above.
Figure 6:
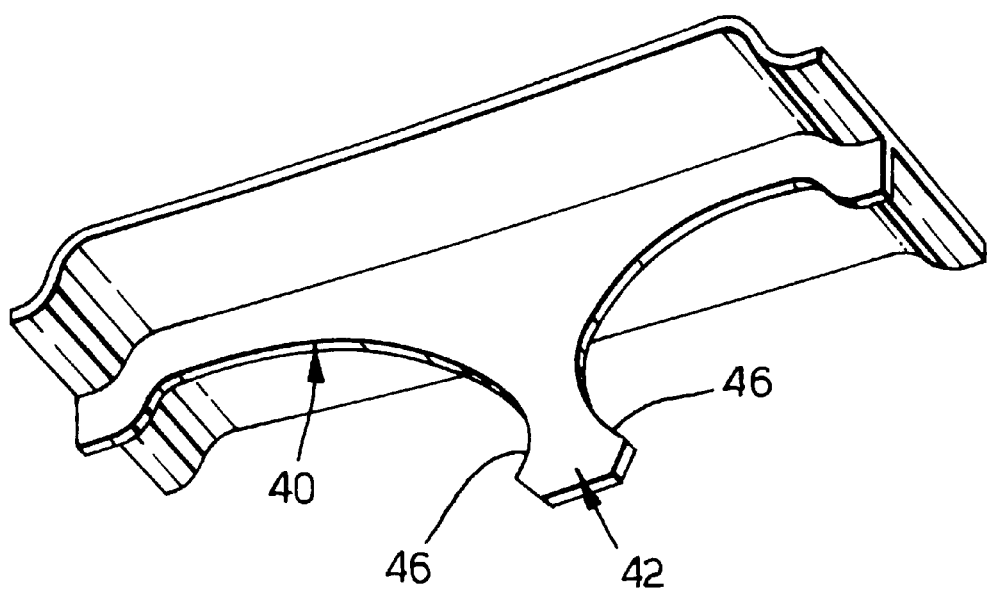
FIG. 6 is a diagrammatic perspective view of the annulus filler of FIG. 2 from below.

Referring in particular to FIGS. 5 and 6, the annulus filler further includes an elongate web 40 which extends generally longitudinally and substantially centrally thereof. The web 40 protrudes radially inwardly from the deck portion 26 and provides centrifugal restraint for the upper deck 26 as described in more detail hereinafter. Integral with the web 40 is a dovetail root 42 which is generally dovetail shaped in radial cross section and which fits into a complementary shaped groove 44 extending circumferentially around the rotor disc. The dovetail root 42 also broadens out towards its base when viewed in circumferential cross section, as shown in FIG. 4. The dovetail root 42 provides the principal radial and axial restraints for the annulus filler 26.

The dovetail root 42 includes angled bearing surfaces 46 which engage complementary angled bearing surfaces 48 in the groove 44. When the rotor disc undergoes rotation, the bearing surfaces 46 are forced into contact with the bearing surfaces 48, which provide the necessary radially inwardly directed force to retain the annulus filler in the groove 44 against the action of centrifugal forces. The geometry and construction of the annulus filler tends also to direct centrifugal forces from the deck portion 26 and the associated seals into the dovetail root 42.

The annulus filler 24 is built up from layers of carbon fibre reinforced plastics material. Two different forms of layer are used. The first form comprises a fabric sheet including interwoven carbon fibre strands, providing substantially equal physical properties in the principal mutually perpendicular axes in the plane of the sheet. The second form is a unidirectional sheet, comprising carbon fibre strands running parallel to one another in a single direction. This material is highly resistant to stresses directed along the fibres. In each case the layers are pre-impregnated with plastics resin, or impregnated using a resin transfer method.

Figure 7:
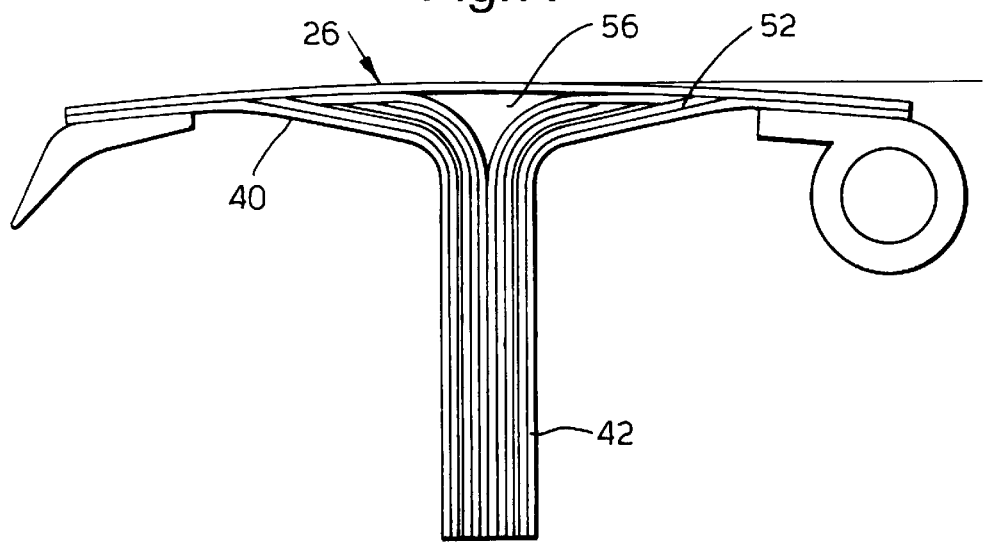
FIG. 7 is a diagrammatic cross section of an annulus filler according to the invention, similar to that of FIG. 4 but on an enlarged scale.
Figure 8:
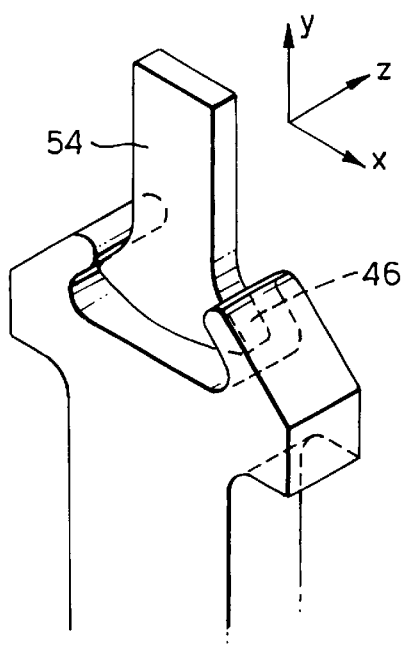
FIG. 8 is a diagrammatic sketch illustrating the orientation of the layers in an annulus filler according to the invention.

Referring in particular to FIGS. 4 and 7, layers 52 within he deck portion 26 are ingressed into the web 40, and continued into the dovetail root 42. Thus the layers are orientated essentially longitudinally of the annulus filler in the deck 26, in the web 40 and in the dovetail root. Thus in the dovetail root the layers 54 are oriented normal to the bearing surfaces 46, in the X-Y plane, illustrated in FIG. 8.

In the dovetail root 42, the layers 54 are mainly fabric sheets comprising interwoven fibres. Thus the layers provide equal physical properties in the principal mutually perpendicular axes in the plane of the sheet. Each layer lies in a plane and that plane is normal to the bearing surfaces of the dovetail root. These fabric sheets extend from the dovetail root 42 up into the under layers of the deck portion 26.

Figure 9:
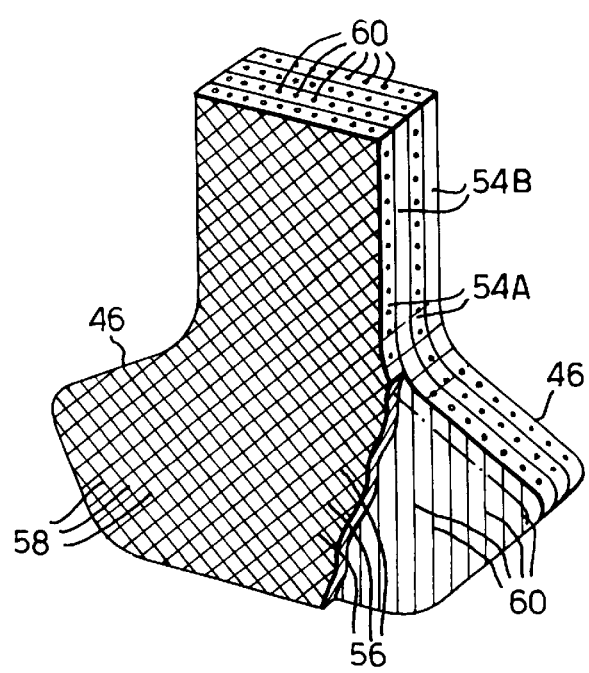
FIG. 9 is a diagrammatic sketch illustrating the orientation of the fibres in the layers in an annulus filler according to the invention.

The layers 54A in the dovetail root 42, of fabric sheets comprising interwoven fibres are arranged so that the carbon fibres 56,58 extending in mutually perpendicular directions are substantially perpendicular to both of the bearing surfaces 46, as shown in FIG. 9. The arrangement of the carbon fibres 56,58 in the layers 54A of fabric sheets comprising interwoven fibres arranged in mutually perpendicular directions prevents crushing and acts against the compressive stress in the plane of the dovetail root 54. The compressive stress experienced by the bearing surfaces 46 of the dovetail root 42 are parallel to the planes of the layers 54A in the dovetail root 42. The dovetail root 42 preferably comprises alternate layers 54A and layers 54B. The layers 54B comprise undirectional sheets of carbon fibres 60 extending parallel to one another for tensile strength. Alternatively the layers 54B are arranged periodically between the layers 54A.

The stress regime within the dovetail root is highly complex, with compression, tension and shear forces dominating in different regions. The use of fabric sheets enables the root to withstand these varied and multi-directional forces.

In contrast, where uni-directional bending stresses dominate, in the deck portion 26 and web 40, uni-directional material may also be used. This has fibre strands running parallel to one another in a single direction. The deck portion 26 includes both woven sheets and unidirectional sheets orientated approximately parallel to the direction of air flow.

The outer layers forming the upper deck airwash surface are continuous across the width and length of the filler up to the edges forming the upper deck top surface. The outer layers on the underside of the top deck are continuous into the web and then into the dovetail root. The dovetail feature requires a thicker section than the web and additional ply sheets are incorporated. These additional sheets are placed within the ply sheets ingressing from the web. It is important not to have ply sheets starting or stopping on the outside of sections as this can lead to peeling and damage.

A central region 56 of the annulus filler is formed from tow filled resin comprising multi-directional strands of carbon fibre.

The annulus filler is manufactured as follows. The various carbon fibre reinforced plastics layers are placed on tooling components (not shown) which when brought together define a mould cavity in the basic shape of the annulus filler. The tooling containing the composite material sheets is then heated in an autoclave at a temperature of about 190° C. and a pressure of about 200 MPa to cure the resin. After curing, the resultant "oversized" filler is machined to the appropriate profile using a diamond grinder or other suitable tool. The rubber edge seals are then post-bonded in position using suitable adhesive.

Annulus fillers according to the invention are up to 60% lighter than existing designs. This has numerous benefits, including reduced fuel costs, reduced weight penalties, reduction of rotational inertia and reduction of out of ba once forces in the event that a filler fails.

Various modifications may be made to the above described embodiment, without departing from the scope of the invention. As an alternative to carbon fibre reinforced plastics material, the following may be used:

Reinforcement: glass, aramid, carbon, alumina, silicon carbide (SiC).

Matrix materials: Non-metallic materials—Thermoplastics and thermosets (e.g. polythene, polycarbonate, polyethersulphone, polyetheretherketone (PEEK), polyvinylchloride (PVC), epoxy resin cured by amines, nylon, polytetrafluoroethelene (PTFE) and perspex), resins (e.g. Epoxy, polyamides, phenolic, silicone, cyanoacryates, anaerobics and acrylics), ceramics (e.g. silicon nitride, silicon carbide, glass-ceramics). Metallic materials—aluminium alloys (e.g. Al—Cu, Al—Mg, AL—Mg—Si, Al—Zn—Mg, Al—Li), magnesium alloys, titanium alloys, nickel alloys and intermetallics e.g. nickel aluminide and gamma titanium aluminide.

The root portions of the fillers may be located in axially directed, rather than circumferentially directed, grooves in the rotor disc. In this case, the layers of fibre reinforced material are still located perpendicular to the bearing surfaces of the root portion. The root portion may comprise a dovetail root as described or, for example, a fir tree root.

Although the invention has been described with particular reference to an annulus filler, it is applicable to any component attached by a root portion to a rotor. For example, the invention is applicable to the root portions of fan, compressor or turbine blades.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A component for a gas turbine engine rotor assembly including a rotor disc, the component including a root member for engagement with the rotor disc to locate the component thereon, and the root member including bearing surfaces for bearing against complementary surfaces on the disc on rotation of the disc, wherein the component includes a plurality of layers of fibre reinforced material, the layers being orientated substantially perpendicular to said bearing surfaces.

2. A component for a gas turbine engine rotor assembly including a rotor disc, the component including a root member for engagement with the rotor disc to locate the component thereon, and the root member including bearing surfaces for bearing against complementary surfaces on the disc on rotation of the disc, wherein the component includes a plurality of layers of fiber reinforced material, the layers being oriented substantially perpendicular to said bearing surfaces, said component including layers of a first fiber reinforced material having fibers oriented in each of two substantially mutually perpendicular directions and the fibers in the layers of first fiber reinforced material being arranged substantially perpendicular to said bearing surface.

3. A component according to claim 2, including layers of a first fibre reinforced material having fibres orientated in each of two substantially mutually perpendicular directions, and layers of a second fibre reinforced material having fibres orientated substantially in a single direction.

4. A component according to claim 1 wherein the fibre reinforced material includes carbon fibre reinforced plastics material.

5. A component according to claim 1 wherein the root member is substantially dovetail shaped in cross section, for engaging a dovetail groove in the rotor disc.

6. A component according to claim 1 wherein the root member includes a fir tree root portion, for engaging a complementary groove in the rotor disc.

7. A component for a gas turbine engine rotor assembly including a rotor disc, the component including a root member for engagement with the rotor disc to locate the component thereon, and the root member including bearing surfaces for bearing against complementary surfaces on the disc on rotation of the disc, wherein the component includes a plurality of layers of fiber reinforced material, the layers being oriented substantially perpendicular to said bearing surfaces, said root member is adapted to engage a groove extending in the circumferential direction of the rotor disc.

8. A component according to claim 1, wherein the root member is adapted to engage groove extending in the axial direction of the rotor disc.

9. A component for a gas turbine engine rotor assembly including a rotor disc, the component including a root member for engagement with the rotor disc to locate the component thereon, and the root member including bearing surfaces for bearing against complementary surfaces on the disc on rotation of the disc, wherein the component includes a plurality of layers of fiber reinforced material, the layers being oriented substantially perpendicular to said bearing surfaces, said component is an annulus filler for a gas turbine engine rotor assembly including a rotor disc mounting a plurality of radially extending rotor blades and the component further including a wall member for at least partially bridging a space between adjacent rotor blades.

10. A component according to claim 9 wherein the wall member and root member are formed as a single integral moulding.

11. A component according to claim 10 wherein at least one layer of fibre reinforced material extends from the wall member into the root member.

12. A component according to claim 10 or claim 11 wherein the wall member includes a substantially smooth outer surface and an inner surface from which the root member projects.

13. A component according to claim 12, further including an elongate stiffening web extending along the wall member on said inner surface thereof, substantially in the axial direction of the rotor assembly when fitted thereto.

14. A component according to claim 13 wherein at least one layer of fibre reinforced material extends from the wall member into the stiffening web.

15. A component according to claim 14 wherein at least one layer of fibre reinforced material extends from the wall member into the stiffening web and further into the root member.

16. A rotor assembly for a gas turbine engine, including at least one component according to claim 1.

17. A gas turbine engine incorporating a rotor assembly according to claim 16.

* * * * *